US009819841B1

(12) United States Patent
Denisenko (10) Patent No.: US 9,819,841 B1
(45) Date of Patent: Nov. 14, 2017

(54) INTEGRATED CIRCUITS WITH OPTICAL FLOW COMPUTATION CIRCUITRY

(71) Applicant: Altera Corporation, San Jose, CA (US)

(72) Inventor: Dmitry N. Denisenko, Toronto (CA)

(73) Assignee: Altera Corporation, San Jose, CA (US)

( * ) Notice: Subject to any disclaimer, the term of this patent is extended or adjusted under 35 U.S.C. 154(b) by 56 days.

(21) Appl. No.: 14/689,792

(22) Filed: Apr. 17, 2015

(51) Int. Cl.
*H04N 5/14* (2006.01)
*G06F 17/16* (2006.01)

(52) U.S. Cl.
CPC ............. *H04N 5/144* (2013.01); *G06F 17/16* (2013.01); *H04N 5/147* (2013.01)

(58) Field of Classification Search
CPC ......... G06F 17/16; H04N 5/144; H04N 5/147
See application file for complete search history.

(56) References Cited

U.S. PATENT DOCUMENTS

| | | | |
|---|---|---|---|
| 5,398,079 A * | 3/1995 | Liu | H04N 5/144 348/699 |
| 6,253,161 B1 * | 6/2001 | Arias-Estrada | G01S 11/12 348/E3.018 |
| 6,456,731 B1 | 9/2002 | Chiba et al. | |
| 6,460,127 B1 * | 10/2002 | Akerib | G06F 15/8023 711/128 |
| 6,788,802 B2 | 9/2004 | Chiba et al. | |
| 7,151,996 B2 * | 12/2006 | Stein | G05D 1/0246 382/181 |
| 7,778,466 B1 | 8/2010 | Medasani et al. | |
| 7,822,231 B2 | 10/2010 | Coimbra et al. | |
| 8,259,809 B2 | 9/2012 | Lin | |
| 8,917,169 B2 * | 12/2014 | Schofield | B60N 2/002 340/425.5 |

(Continued)

OTHER PUBLICATIONS

Mahalingam et al., "A VLSI Architecture and Algorithm for Lucas—Kanade-Based Optical Flow Computation", IEEE Transactions on Very Large Scale Integration (VLSI) Systems, vol. 18, No. 1, 2010, 29-38.*

(Continued)

*Primary Examiner* — Katrina Fujita
(74) *Attorney, Agent, or Firm* — Treyz Law Group, P.C.; Jason Tsai; Joseph F. Guihan (57) ABSTRACT

An integrated circuit with optical flow computation circuitry is provided. The optical flow computation circuitry may include a first image shift register for receiving pixel values from a current video frame, a second image shift register for receiving pixel values from a previous video frame, column shift registers for storing column sums of various gradient-based values, square sum registers for storing square sums generated at least partly based on the column sum values, and an associated computation circuit that constructs a gradient matrix based on values stored in the square sum registers and that computes a 2-dimensional optical flow vector based on an inverse of the gradient matrix and differences between the current and previous frames. Optical flow computing circuitry configured in this way may be capable of supporting dense optical flow calculation for at least one pixel per clock cycle while supporting large window sizes.

18 Claims, 7 Drawing Sheets

(56) References Cited

U.S. PATENT DOCUMENTS

| | | | | |
|---|---|---|---|---|
| 2008/0313439 | A1* | 12/2008 | Suzuki | G06T 1/20 |
| | | | | 712/225 |
| 2011/0043706 | A1* | 2/2011 | Van Beek | G06T 7/0002 |
| | | | | 348/699 |
| 2011/0285886 | A1* | 11/2011 | Kato | H04N 5/3458 |
| | | | | 348/297 |
| 2013/0076915 | A1 | 3/2013 | Ramachandran et al. | |
| 2013/0107124 | A1* | 5/2013 | Kawai | H04N 5/145 |
| | | | | 348/699 |
| 2013/0182160 | A1* | 7/2013 | Pitter | H04N 5/343 |
| | | | | 348/296 |
| 2014/0340405 | A1 | 11/2014 | dos Santos et al. | |
| 2015/0332104 | A1* | 11/2015 | Kapach | G06K 9/6215 |
| | | | | 382/104 |
| 2015/0332114 | A1* | 11/2015 | Springer | G06K 9/4604 |
| | | | | 348/148 |

OTHER PUBLICATIONS

Gealow et al. "A pixel-parallel image processor using logic pitch-matched to dynamic memory." IEEE Journal of Solid-State Circuits 34.6 (1999): 831-839.*

Komuro et al. "A dynamically reconfigurable SIMD processor for a vision chip." IEEE journal of solid-state circuits 39.1 (2004): 265-268.*

Mehta et al. "A simplified normal optical flow measurement CMOS camera." IEEE Transactions on Circuits and Systems I: Regular Papers 53.6 (2006): 1223-1234.*

Bouguet, Jean-Yves, "Pyramidal Implementation of the Lucas Kanade Feature Tracker Description of the Algorithm", Intel Corporation, Microprocessor Research Labs, 2001.

* cited by examiner

INTEGRATED CIRCUITS WITH OPTICAL FLOW COMPUTATION CIRCUITRY

BACKGROUND

This relates to integrated circuits and more particularly, to integrated circuits that include circuitry for implementing optical flow computation.

In the context of the present application, optical flow computation refers to a method for detecting motion between two successive video frames. Consider a scenario in which a first video frame records a thrown baseball located at the center of the first video frame and in which a second video frame records the baseball located slightly to the right of the center of the frame. The optical flow algorithm can be used to analyze the differences between the two video frames and to determine that the baseball is moving towards the right edge of the frame (i.e., by computing spatial gradient matrices for each predefined window in successive frames, according to the well-known Lucas Kanade feature tracking algorithm).

Circuits for implementing optical flow on programmable logic devices (PLDs) have been developed. Conventional optical flow implementations on programmable logic devices, however, involve storing a substantial amount of computed information generated during the optical flow algorithm in external memory and arithmetic circuitry. The optical flow performance is therefore limited by the bandwidth of the external memory and the amount of arithmetic circuits available on the integrated circuit. As a result, conventional optical flow implementations can only support a fairly "sparse" flow (i.e., only a small fraction of pixels within a given frame is being analyzed) and a fairly small window size for each gradient matrix computation (i.e., window sizes are limited to no more than 15 by 15 pixels).

It is within this context that the embodiments described herein arise.

SUMMARY

An integrated circuit such as a programmable integrated circuit is provided that includes optical flow computation circuitry. The optical flow computation circuitry may include a first storage circuit (e.g., a first image shift register) for storing data from a current video frame, a second storage circuit (e.g., a second image shift register) for storing data from a previous video frame, and a computation circuit that computes one pixel of output per clock cycle at least partly based on the image data stored in the first and second image shift registers. In one suitable arrangement, the second image shift register may receive the image data of the previous frame from an external off-chip memory device, where the computation of the pixel output from the computation circuit only requires communication with the external memory when receiving the image data of the previous video frame at the second image shift register. In another suitable arrangement, the computation of the pixel output from the computation circuit does not involve any communication with the external memory device.

The optical flow computation circuitry may be configured to compute a first gradient matrix for a first pixel and to compute a second gradient matrix for a second subsequent pixel by reusing at least part of the first gradient matrix associated with the first pixel. The second pixel may be located immediately following the first pixel in the same row. Computation of the first gradient matrix includes computing column sum values based on horizontal and vertical gradient values associated with a column of pixels and computing at least one square sum value based on the column sum values.

Computation of the second gradient matrix may include subtracting from the square sum value a left-most column sum in a window associated with the first pixel and adding to the resulting square sum value a right-most column sum in another window associated with the second pixel. The right-most column sum may be computed by identifying a column sum associated with a third pixel that is located immediately above the second pixel, subtracting a first gradient-based value from the column sum associated with the third pixel and then adding a second gradient-based value of the second pixel to the resulting column sum. Gradient matrices constructed incrementally from previous gradient matrices in this way while minimizing interactions with the external memory and reducing the amount of arithmetic circuitry required help to enable dense optical flow calculation and to support large window sizes (e.g., window sizes of 50 by 50 pixels or larger).

Further features of the present invention, its nature and various advantages will be more apparent from the accompanying drawings and the following detailed description.

DETAILED DESCRIPTION

The present invention relates to an efficient way of implementing optical flow on an integrated circuit. While conventional optical flow implementations are limited by external memory bandwidth, embodiments herein describe a way of reducing reliance on the off-chip memory. As a result, a substantially denser optical flow analysis can be performed in real time (e.g., optical flow can be computed for every pixel in a given frame).

This may be accomplished by chaining multiple shift registers within the integrated circuit so that all intermediate information is computed in a pipelined manner and by reusing gradient matrix values from a previous pixel to compute the gradient matrix for a current pixel while performing a minimum number of calculations. Configured in this way, an improved optical flow computing circuitry is provided that is able to support one pixel of output per clock cycle and that is also able to support window sizes of larger than 15 by 15 pixels (e.g., up to window sizes of 100 by 100 pixels or more).

If desired, the improved optical flow computation circuitry may be implemented on integrated circuits that are not traditionally referred to as programmable logic devices such as microprocessors containing programmable logic, digital signal processors containing programmable logic, custom integrated circuits containing regions of programmable logic, or other programmable integrated circuits that contain programmable logic. The present invention will generally be described in the context of integrated circuits such as programmable logic device integrated circuits as an example.

It will be recognized by one skilled in the art, that the present exemplary embodiments may be practiced without some or all of these specific details. In other instances, well-known operations have not been described in detail in order not to unnecessarily obscure the present embodiments.

Figure 1:
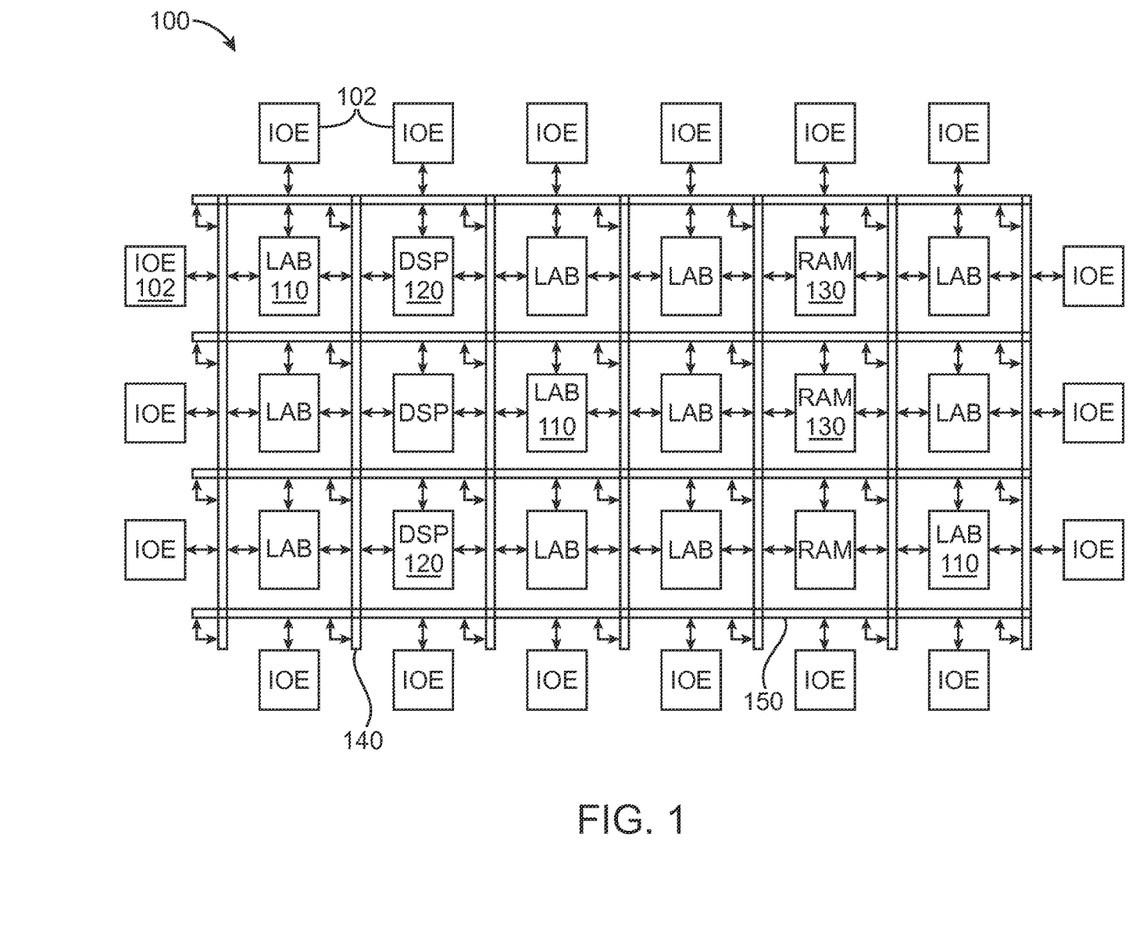
FIG. 1 is a diagram of an illustrative programmable integrated circuit in accordance with an embodiment.

An illustrative integrated circuit such as a programmable logic device (PLD) 10 is shown in FIG. 1. As shown in FIG. 1, PLD 10 may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, DSP 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
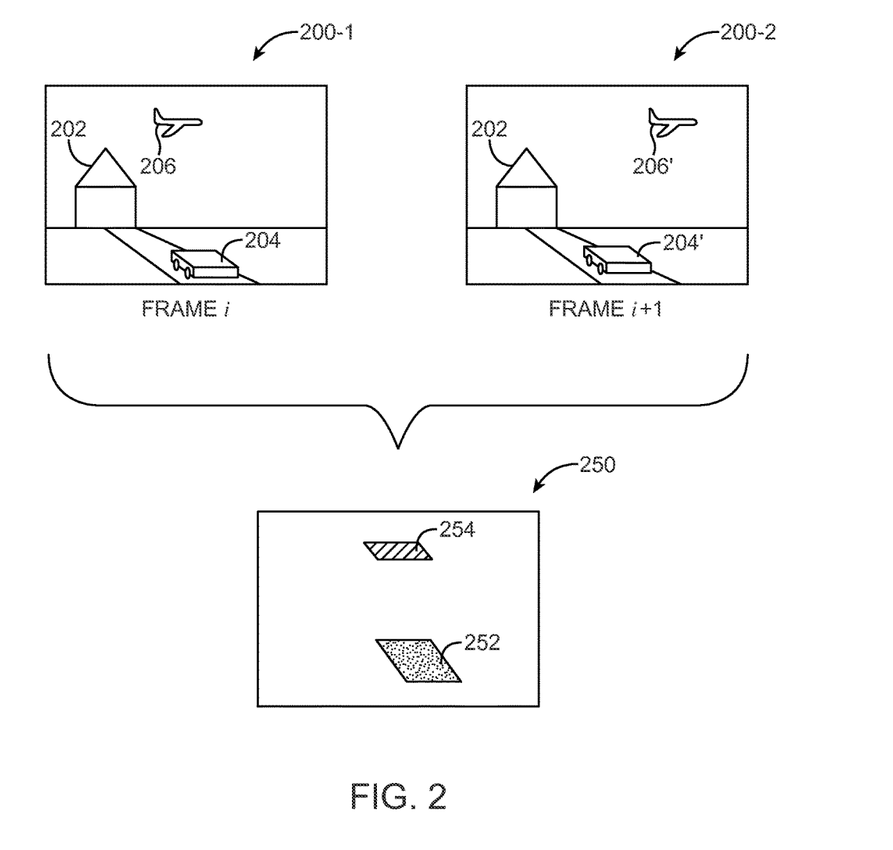
FIG. 2 is a diagram of a 2-dimensional optical flow vector that can be generated from two successive frames in accordance with an embodiment.

As described above, the optical flow algorithm can be used to detect motion by analyzing two successive video frames. FIG. 2 is a diagram showing a 2-dimensional optical flow vector that can be generated from two successive frames. FIG. 2 shows a first image frame 200-1 (i.e., frame i) and a second successive image frame 200-2 (i.e., frame i+1) that is captured immediately following the first image frame 200-1. As shown in FIG. 2, first frame 200-1 includes a car 204 that is travelling towards a house 202 and an airplane 206 that is flying across the horizon. The second frame 200-2 shows the car 204' that is slightly closer to house 202 relative to its position in the previous frame (i.e., the first frame 200-1) and the airplane 206' that is slightly shifted to the right relative to its position in the previous frame.

To determine the motion between successive frames, the optical flow algorithm effectively compares the position of objects in the successive frames to determine which direction, if any, a particular object has shifted from one from to the next (i.e., by identifying changes between consecutive video frames). In the example of FIG. 2, the car has shifted towards the upper left corner of the frame towards the house 202 (which remains stationary between the frames), whereas the airplane has shifted towards the right edge of the frame.

In some embodiments, the detected motion can be represented as a 2-dimensional optical flow vector having values indicative of the directionality of any moving objects and the relative speed at which the objects are moving. Diagram 250 in FIG. 2 illustrates a compact visual representation of an exemplary 2D optical flow vector. As shown in diagram 250, a first marked region 252 identifies a first portion of the frame in which an object (e.g., the car) is moving a first direction while a second marked region 252 identifies a second portion of the frame in which another object (e.g., the airplane) is moving in a second direction that is different than the first.

In general, the directionality of the movements may be color-coded (as an example). For instance, any detected movement towards the right edge of the frame may indicated by the color red; any detected movement towards the left edge of the frame may be indicated by the color green; any detected movement towards the upper edge of the frame may be indicated by the color blue; and any detected movement towards the bottom edge of the frame may be indicated by the color yellow. Any other direction may be represented as a combination of at least two of the four predetermined colors. In this example, the second marked region 252 in which the car is moving towards the top left corner of the frame may be represented as a combination of blue (indicative of the upward movement) and green (indicative of the leftward movement).

If desired, the rate of change of the detected movement can be encoded by the saturation of a particular color. For example, a faster movement can be represented by a more saturated color (i.e., a darker color), whereas a slower movement can be represented by a less saturated color (i.e., a lighter color). In the example of FIG. 2, the saturation of region 252 may be different than the saturation of region 254 to reflect the difference in the speed at which the car is moving relative to the speed at which the airplane is moving in the consecutive frames. Using colors and the relative saturation to represent the various movements in an optical flow output is merely illustrative. If desired, other suitable ways of representing 2D optical flow vectors may be used.

Figure 3:
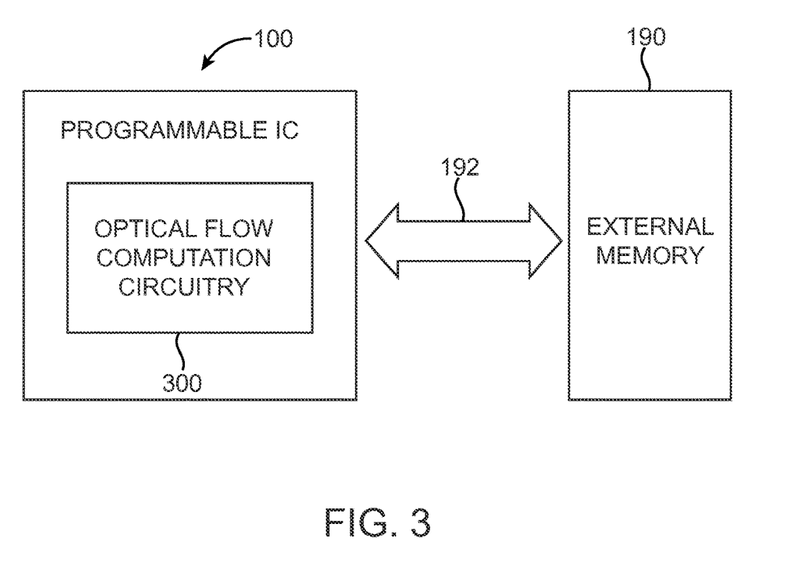
FIG. 3 is a diagram of an illustrative programmable integrated circuit that includes optical flow computation circuitry and that communicates with off-chip memory in accordance with an embodiment.

FIG. 3 shows how an integrated circuit such as programmable integrated circuit 100 may include optical flow computation circuitry 300. In accordance with some embodiments, optical flow computation circuitry 300 may be configured to retrieve at least some information from an off-chip memory device 190 via a dedicated memory bus 192. As described above, the optical flow algorithm performs computation based on data from two image frames. The external off-chip memory device 192 may therefore be used to store the current frame so that it can be retrieved as the previous frame in the next clock cycle. Arranged in this way, circuitry 300 may therefore buffer the current frame on-chip while retrieving data associated with the previous frame from the off-chip memory to compute the optical flow output.

Any intermediate data that is generated by the optical flow computation circuitry 300 for computing the 2D optical flow vector may be stored internally on-chip without relying on the external memory for storage, thereby reducing interactions with the system memory via bus 192. Minimizing external memory traffic helps to improve overall optical flow performance by removing the external memory bandwidth constraint limiting conventional optical flow implementations on programmable logic devices. This is merely illustrative. In yet other suitable embodiments, optical flow computation circuitry 300 need not necessarily communicate with memory 190 at all if device 100 has sufficient storage space to absorb all data associated with at least two video frames.

Figure 4:
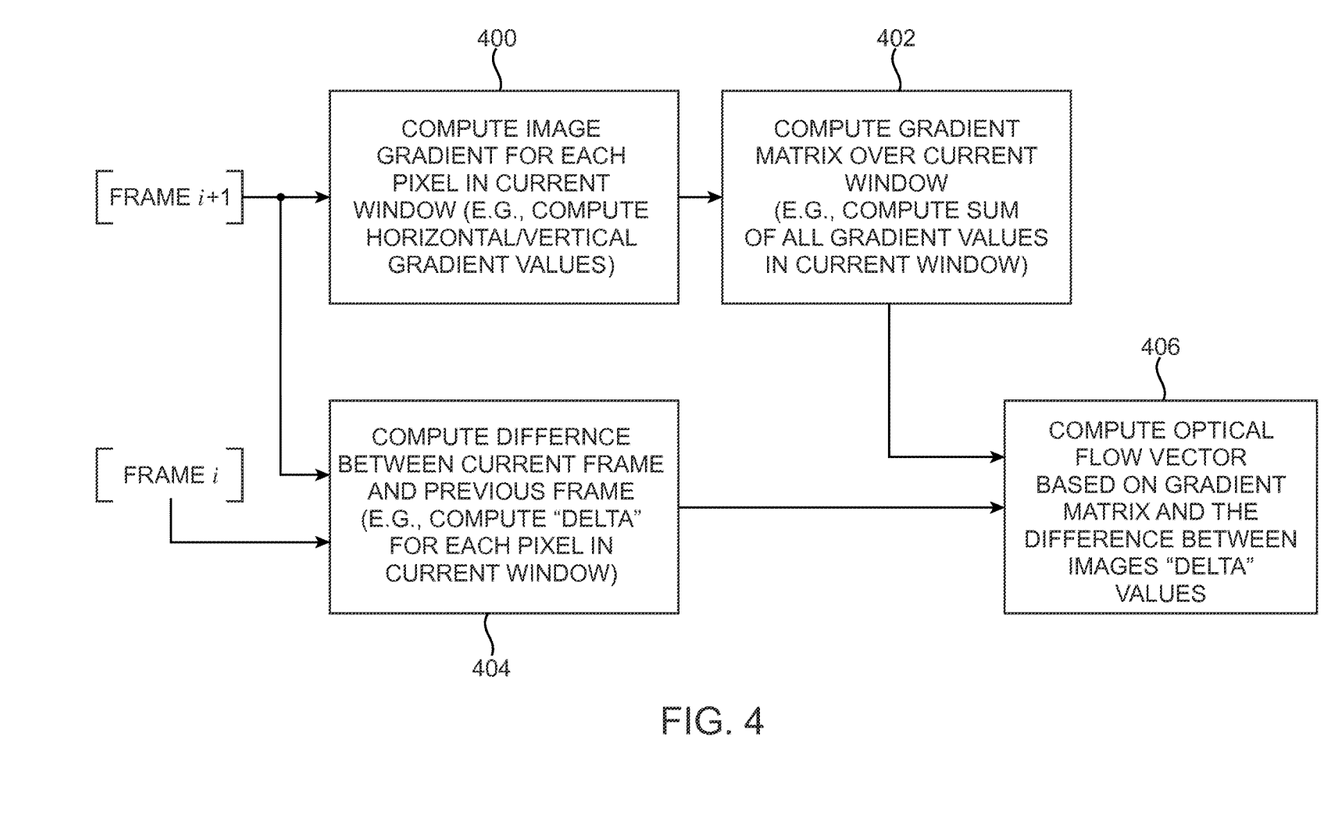
FIG. 4 is a diagram illustrating steps involved in performing optical flow in accordance with an embodiment.

FIG. 4 illustrates high-level logical steps involved in the optical flow algorithm. As shown in FIG. 4, the optical flow may be performed on [frame i+1] (sometimes referred to as the "current" frame) and on [frame i] (sometimes referred to as the "previous" frame). In accordance with an embodiment, the optical flow computation circuitry may be configured to compute values for a group of pixels associated with a given pixel. Each group of pixel associated with a given pixel may be referred to as a "window" of pixels. In general, a window may be a square-shaped region that is at least 5 by 5 pixels, at least 10 by 10 pixels, at least 25 by 25 pixels, at least 50 by 50 pixels, at least 100 by 100 pixels, etc. The given pixel may be located at the center of the window, at one of the corners of the window, at an edge of the window, or at other positions inside the window. This is merely illustrative. In general, a window can have a rectangular shape, a circular shape, an oval shape, other regular shapes, or other irregular shapes.

The optical flow computation circuitry may be configured to compute window values for at least some subset of pixels within a particular video frame. Consider, for example, a frame that includes 20 million pixels. In an arrangement in which every pixel in the frame is being analyzed (considered to be a "dense" optical flow calculation), then values for 20 million corresponding windows will have to be computed. In another suitable arrangement in which every tenth pixel in a given row and in a given column of the frame is being analyzed (considered to be a relatively "sparse" or "non-dense" optical flow calculation), then values for only 200,000 corresponding windows (i.e., 20 million total pixels divided by a factor of 100) will have to be computed. The embodiments herein allow for dense optical flow computation without requiring heavy traffic with the external memory component.

At step 400, the optical flow computation circuitry may be configured to compute an image gradient for each pixel in a current window. For example, horizontal and vertical gradient values may be computed for each pixel across the entire window (e.g., gradient values computed based on gray scale values associated with each image pixel).

At step 402, the optical flow computation circuitry may then be configured to generate a corresponding gradient matrix for the current window based at least partly on the gradient values computed during step 400. For example, the gradient matrix may include values computed based at least partly on the sum of all horizontal and/or vertical gradient values across the current window.

At step 404, the optical flow computation circuitry may be configured to compute difference values (sometimes referred to herein as "delta" values) between the current frame and the previous frame. The delta values may be computed for each pixel in a current window. Information associated with the previous frame may, for example, be retrieved from the external memory (e.g., memory device 190 of FIG. 3).

At step 406, the optical flow computation circuitry can then be configured to compute a resulting optical flow vector based on the gradient matrix obtained from step 402 and the delta values obtained from step 404. The steps of FIG. 4 may be iterated for every window across the current video frame in a pipelined fashion. In particular, one or more pixels of a dense optical flow can be computed per clock cycle. Operated in this way, the optical flow output for the top of the frame can be produced even before the whole frame has been consumed at the input.

Figure 5:
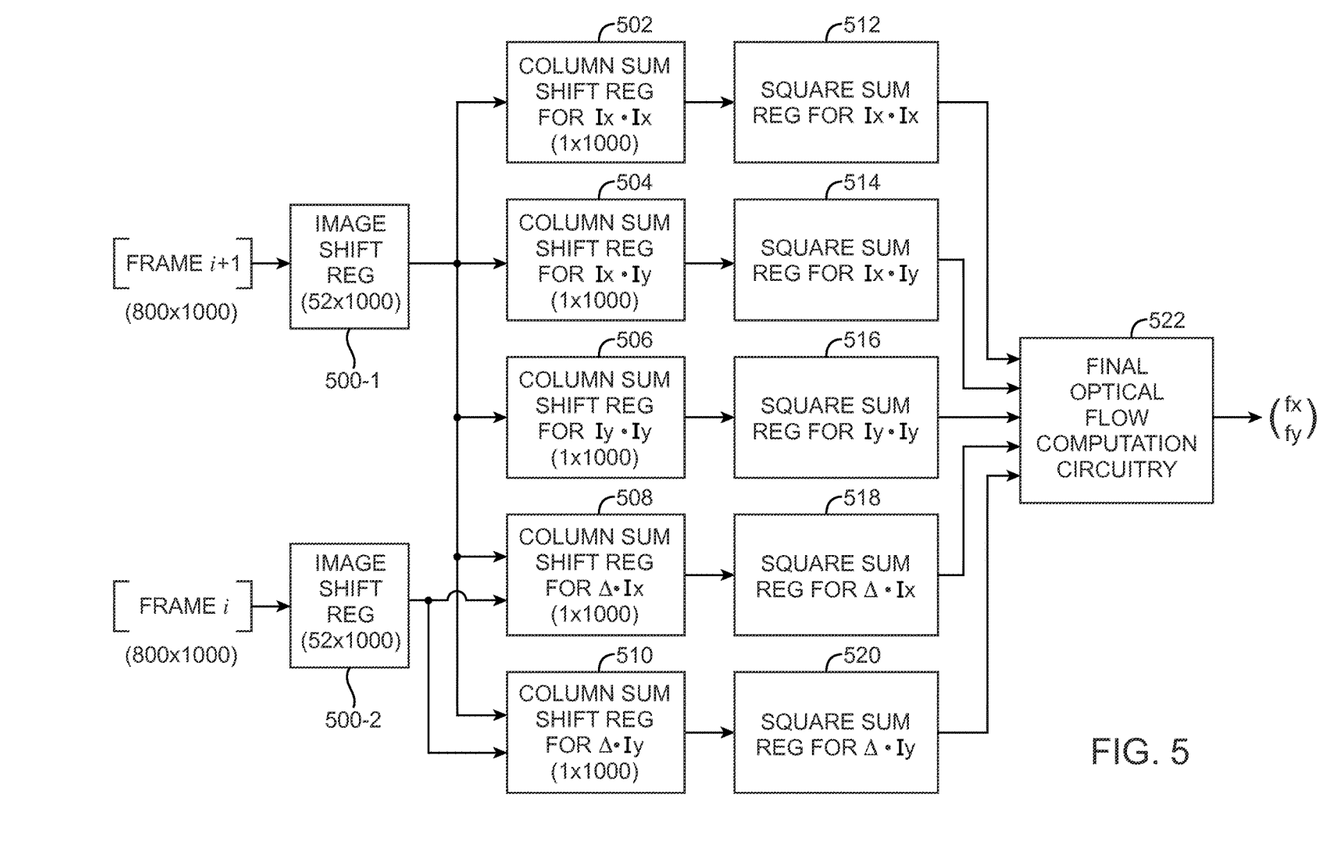
FIG. 5 is a circuit diagram of illustrative optical flow computation circuitry implemented using shift registers in accordance with an embodiment.

FIG. 5 shows one suitable circuit implementation of the optical flow computation circuitry 300. As shown in FIG. 5, circuitry 300 may include a first image shift register 500-1, a second image shift register 500-2, multiple column sum shift registers (e.g., shift registers 502, 504, 506, 508, and 510), multiple square sum registers (e.g., registers 512, 514, 516, 518, and 520), and a final optical flow computation circuit 522.

In the example of FIG. 5, each video frame includes 800 by 1000 pixels (e.g., a frame with 800 rows by 1000 columns of image pixels). First image shift register 500-1 may be used to receive pixel data from a current frame (e.g., a video frame output directly from an image sensor), whereas second image shift register 500-2 may be used to receive pixel data from a previous frame (e.g., a video frame that is temporarily stored in the external memory).

In general, the image shift registers may each be capable of storing (window size+2)*(image width) individual pixel values. The image width may refer to the number of columns in the frame. The additional "+2" to the window size helps to ensure that enough extra pixel values are being buffered for the image gradient calculations. Assuming (in the example of FIG. 5) a window size of 50 by 50 pixels, image shift registers 500-1 and 500-2 may each have a capacity of at least 52*1000 pixel values.

The image shift registers may be configured to continuously shift individual pixel values into the column sum shift registers (e.g., to shift one pixel per clock cycle into the column sum shift registers). The column sum shift registers may be used to store information computed at least party based on a horizontal gradient Ix and a vertical gradient Iy. Each of the column sum shift registers may be capable of storing 1*(image width) gradient-based values. Gradient-based values may be defined as values computed based at least party on Ix and/or Iy (e.g., results of Ix*Ix, Iy*Iy, Ix*Iy, some multiple or factor of Ix, some multiple or factor of Iy, etc.). In the example of FIG. 5, each of the column sum shift registers may be able to store at least 1000 gradient-based values. Storing column sums of gradient-based values (e.g., sums of gradient-based values in a particular column of a window) allows for gradient matrices to be efficiently constructed from one pixel to another.

As shown in FIG. 5, column sum shift register 502 may be configured to store a window column sum based on Ix*Ix for a given pixel at image location (x,y) according to the following expression:

$$\sum_{z=0}^{window\ size}[image(x+1,y-z)-image(x-1,y-z)]^2$$

As illustrated in the expression above, horizontal gradient Ix may be defined as the difference in pixel value between a column of pixels to the left of the given pixel of interest and a column of pixels to the right of the given pixel of interest, where the depth of the column is defined by the window size. Note that for all image values that extend beyond the border of the frame, the image values may have a default value of zero.

Column sum shift register 504 may be configured to store a window column sum based on Ix*Iy for a given pixel at frame location (x,y) according to the following expression:

$$\sum_{z=0}^{window\ size}[image(x+1,y-z)-image(x-1,y-z)] \times$$

$$[image(x,y-z+1)-image(x,y-z-1)]$$

As illustrated in the expression above, vertical gradient Iy may be defined as the difference in pixel value for pixels immediately above a given pixel in the column of interest and immediate below the given pixel in the column of interest, where the depth of the column is defined by the window size. Note that for all image values that extend beyond the border of the frame, the image values may have a default value of zero.

Similarly, column sum shift register 506 may be configured to store a window column sum based on Iy*Iy for a given pixel at frame location (x,y) according to the following expression:

$$\sum_{z=0}^{window\ size}[image(x,y-z+1)-image(x,y-z-1)]^2$$

Any arithmetic operation that is required for computing the column sums for registers 502, 504, and 506 may be performed by associated computation and control circuitry (not shown in FIG. 5 but may be formed as part of circuitry 300 in FIG. 3). As shown in FIG. 5, column sum shift registers 502, 504, and 506 may compute gradient-based values based only on values received from the first image shift register 500-1 that stores pixels values in the current frame.

In contrast, column sum shift registers 508 and 510 may compute values based on values received from both the first image shift register 500-1 and the second image shift register 500-2. Column sum shift register 508 may be configured to store a window column sum based on $\Delta$*Ix for a given pixel at frame location (x,y) according to the following expression:

$$\sum_{z=0}^{window\ size}[image(x,y-z)-image_{prev}(x,y-z)] \times$$

$$[image(x+1,y-z)-image(x-1,y-z)]$$

where $image_{prev}$ represents image data from the previous frame that is stored in the second image shift register 500-2. As shown in the expression above, delta $\Delta$ may represent the difference between the current image and the previous image for a column of pixels starting at the given pixel of interest, where the depth of the column is defined by the window size. Similarly, column sum shift register 510 may be configured to store a window column sum based on $\Delta$*Iy for a given pixel at frame location (x,y) according to the following expression:

$$\sum_{z=0}^{window\ size}[image(x,y-z)-image_{prev}(x,y-z)] \times$$

$$[image(x,y-z+1)-image(x,y-z-1)]$$

As described above, any arithmetic operation that is required for computing the column sums for registers 508 and 510 (e.g., circuitry for computing the "difference between images" delta values) may be performed by associated computation and control circuitry (not shown in FIG. 5 but may be formed as part of circuitry 300 in FIG. 3).

In accordance with an embodiment of the present invention, the column sum values stored in the column sum shift registers may be used to incrementally compute corresponding square sum values which are stored in the square sum registers (e.g., in square sum registers 512, 514, 516, 518, and 520). A gradient matrix for a given pixel can then be constructed based on the values stored in the square sum registers.

Figure 6:
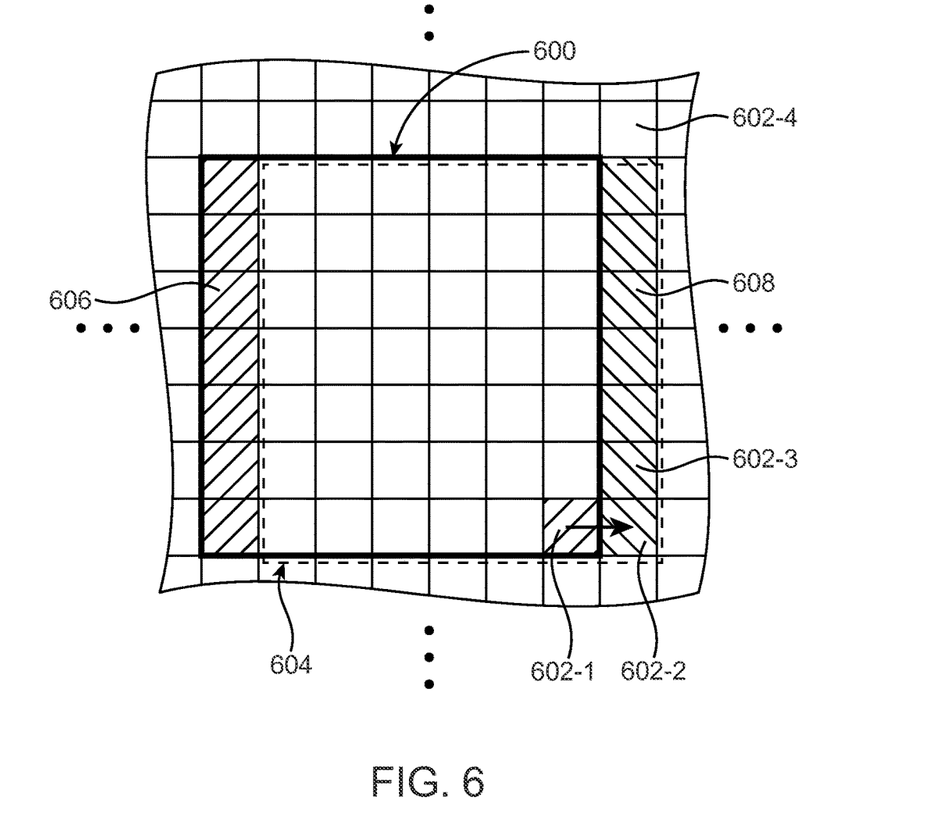
FIG. 6 is a diagram showing how a gradient matrix can be incrementally computed for successive image pixels in accordance with an embodiment.

The concept of computing square sum values for a current window from the column sum values is illustrated in FIG. 6

(which assumes an exemplary window size of 7 by 7 pixels). As shown in FIG. 6, pixel 602-1 may be associated with window 600. Window 600 may have a square sum value that is calculated by summing all the column sums within window 600 and that is temporarily stored in a square sum register.

In a subsequent clock cycle, pixel 602-2 that immediately follows pixel 602-1 may be analyzed. To efficiently calculate the square sum value for pixel 602-1 (see, dotted window 604 associated with pixel 602-2), the optical flow computation circuitry can retrieve the square sum value of the previous pixel (e.g., pixel 602-1) from the square sum register, and then (1) subtract the column sum of the left-most (shaded) column 606 and (2) add the column sum of the new right-most (shaded) column 608. The column sum of the left-most column 606 can be easily retrieved from the column sum shift register.

To compute the column sum of the new right-most column 608, the optical flow computation circuitry may retrieve the column sum associated with the pixel immediately above the current pixel (e.g., pixel 602-3 in FIG. 6) by looking up the corresponding column sum value in the column sum shift register. The optical flow computation circuitry may then subtract the top-most gradient-based value from the retrieved column sum (e.g., by looking up the value of pixel 602-4 from the image shift register and computing the gradient-based value on the fly) and then add the gradient-based value associated with the current pixel 602-2 to the corresponding result to obtain the desired column sum value of the new right-most column 608.

Referring back to FIG. 5, the square sum value for register 512 may be computed based on the column sum values stored in shift register 502 using the approach of FIG. 6. Similarly, the square sum values for register 514 may be computed based on the column sum values stored in shift register 504 also using the approach of FIG. 6. The square sum values for register 516 may be computed based on the column sum values stored in shift register 506 also using the approach of FIG. 6. The square sum values for register 518 and 520 may be computed based on the column sum values stored in shift registers 508 and 510, respectively, also using a similar approach to that of FIG. 6.

Chaining shift registers to do all the arithmetic computations in this pipelined manner so that none of the intermediate data needs to be stored in external memory and computing square sum values by reusing values from previous pixels while performing a minimum number of additional calculations enables the optical flow computation circuitry to perform dense optical flow (e.g., one or more pixels analyzed per clock cycle) and to support large optical flow window sizes (e.g., window sizes of greater than 10 by 10 pixels, greater than 20 by 20 pixels, greater than 50 by 50 pixels, greater than 100 by 100 pixels, etc.). By producing one pixel of output per clock cycle, a greater than 60 frames-per-second frame rate can be achieved for 1 Megapixel images (as an example). It might also be worth noting that only the image shift registers scale according to the window size, but since the image shift registers only need to store the smallest data type (e.g., 8-bit integers), the overall computation pipeline is able to adapt to small or large window sizes without being limited by on-chip storage space.

Referring still to FIG. 5, final optical flow computation circuit 522 may receive square sum values from each of the square sum registers (e.g., from registers 512, 514, 516, 518, and 520) to compute a 2D optical flow vector (fx, fy). In particular, circuit 522 may be configured to compute a gradient matrix G based on the following equation:

$$G = \begin{bmatrix} \text{sq\_sum}(Ix^*Ix) & \text{sq\_sum}(Ix^*Iy) \\ \text{sq\_sum}(Ix^*Iy) & \text{sq\_sum}(Iy^*Iy) \end{bmatrix} \qquad (1)$$

where sq_sum(Ix*Ix) represents the square sum value retrieved from register 512, where sq_sum(Ix*Iy) represents the square sum value retrieved from register 514, and where sq_sum(Iy*Iy) represents the square sum value retrieved from register 516. Once gradient matrix G has been obtained, circuit 522 may then compute the 2D optical flow vector (fx, fy) using the following equation:

$$\begin{pmatrix} fx \\ fy \end{pmatrix} = G^{-1} \times \begin{pmatrix} \text{sq\_sum}(\Delta^*Ix) \\ \text{sq\_sum}(\Delta^*Iy) \end{pmatrix} \qquad (2)$$

where $G^{-1}$ represents the inverse of the 2×2 gradient matrix G computed using equation 1. Sq_sum($\Delta$*Ix) represents the square sum value retrieved from register 518, whereas sq_sum($\Delta$*Iy) represents the square sum value retrieved from register 520. As described above in connection with FIG. 2, (fx, fy) can be converted to a corresponding color with a certain saturation to compactly represent the flow value at every pixel.

Figure 7:
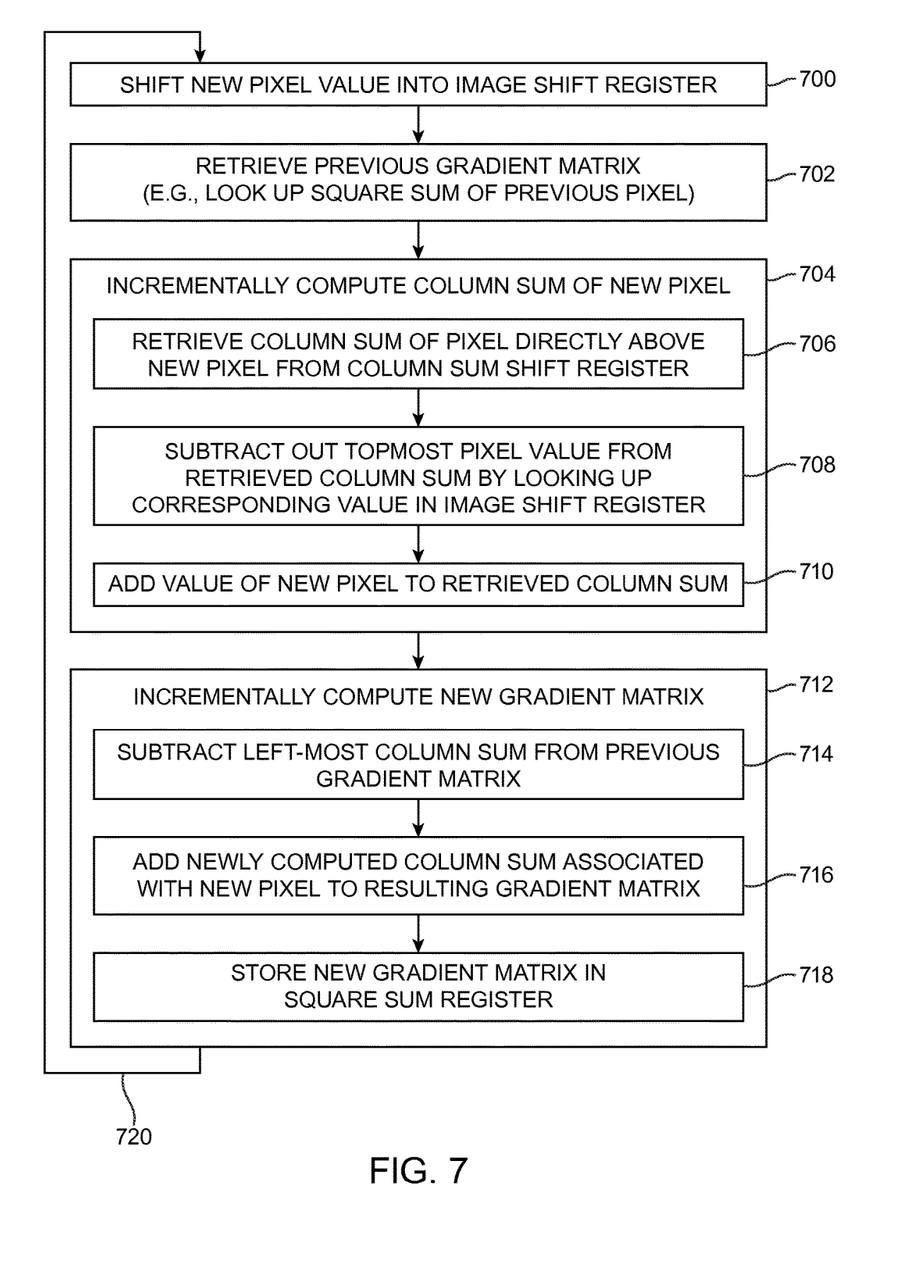
FIG. 7 is a flow chart of illustrative steps involved in computing a gradient matrix in a way shown in FIG. 6 in accordance with an embodiment.

FIG. 7 shows a flow chart of illustrative steps involved in computing a gradient matrix for each pixel in successive video frames. At step 700, a new pixel value may be shifted into an image shift register (e.g., an incoming pixel value from the current frame may be shifted into image shift register 500-1 of FIG. 5).

At step 702, values of the previous gradient matrix may be retrieved by looking up the square sum values associated with the previous pixel (e.g., by retrieving the square sum values currently stored in registers 512, 514, and 516).

At step 704, the column sum of the new incoming pixel may be incrementally computed. At step 706, the column sum of the pixel directly above the new pixel may be retrieved from the column sum shift register(s). At step 708, the gradient value of the topmost pixel may be subtracted from the retrieved column sum by looking up the corresponding pixel value in the image shift register and computing the gradient-based value on the fly. At step 710, the gradient-based value of the new pixel may then be added to the result of step 708 to obtain the final column sum of the new pixel.

At step 712, the gradient matrix of the new pixel may be incrementally computed. At step 714, the left-most column can be subtracted from the previous gradient matrix values (e.g., from left-most column sum can be subtracted from the square sum currently stored in the square sum registers). At step 716, the final column sum of the new pixel obtained during step 704 may then be added to the result of step 714. At step 718, the new gradient matrix values may be stored in the square sum registers (e.g., in at least registers 512, 514, and 516 of FIG. 5). The steps of FIG. 7 are similar to the method described in connection with FIG. 6. At least some of the steps of FIG. 7 can be altered, omitted, or modified without departing from the scope of the present invention.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. An integrated circuit, comprising:
   a first storage circuit that stores image data from a current video frame;
   a second storage circuit that stores image data from a previous video frame;
   a plurality of column sum shift registers, wherein each column sum shift register receives input from at least the first storage circuit;
   a plurality of square sum registers, wherein each square sum register receives input from a respective column sum shift register; and
   an optical flow computation circuit that computes one pixel of output per clock cycle at least partly based on input from each square sum register of the plurality of square sum registers.

2. The integrated circuit defined in claim 1, wherein the second storage circuit receives the image data of the previous video frame from an external memory device.

3. The integrated circuit defined in claim 2, wherein the computation of the pixel output from the optical flow computation circuit only requires communication with the external memory when receiving the image data of the previous video frame at the second storage circuit.

4. The integrated circuit defined in claim 1, wherein the computation of the pixel output from the optical flow computation circuitry does not involve any communication with an external memory device.

5. The integrated circuit defined in claim 1, wherein the optical flow computation circuit is configured to compute a gradient matrix for a window size of at least 20 by 20 pixels.

6. The integrated circuit defined in claim 1, wherein the optical flow computation circuit is configured to compute a gradient matrix for a window size of at least 50 by 50 pixels.

7. The integrated circuit defined in claim 1, further comprising:
   programmable logic circuitry.

8. A method for computing an optical flow output on an integrated circuit, comprising:
   computing a first gradient matrix for a first pixel by computing column sum values based on horizontal and vertical gradient values associated with a column of pixels and by computing a square sum value based on the column sum values; and
   computing a second gradient matrix for a second pixel by reusing at least part of the first gradient matrix associated with the first pixel and by subtracting a left-most column sum in a window associated with the first pixel from the square sum value, wherein the second pixel is different than the first pixel.

9. The method defined in claim 8, wherein computing the second gradient matrix further comprises adding a right-most column sum in another window associated with the second pixel to the square sum value.

10. The method defined in claim 9, wherein the right-most column sum is computed by identifying a column sum associated with a third pixel that is located immediately above the second pixel.

11. The method defined in claim 10, wherein the right-most column sum is computed by further subtracting a first gradient-based value from the column sum associated with the third pixel and adding a second gradient-based value of the second pixel.

12. The integrated circuit defined in claim 1, wherein the plurality of column sum shift registers includes a first column sum shift register that receives input from only the first storage circuit and a second column sum shift register that receives input from the first and second storage circuits.

13. The integrated circuit defined in claim 1, wherein the plurality of column sum shift registers includes first, second, and third column sum shift registers that receive input from only the first storage circuit and fourth and fifth column sum shift registers that receive input from the first and second storage circuits.

14. The integrated circuit defined in claim 13, wherein the first column sum shift register determines a first column sum based on a horizontal gradient associated with the current video frame.

15. The integrated circuit defined in claim 14, wherein the second column sum shift register determines a second column sum based on the horizontal gradient and a vertical gradient associated with the current video frame.

16. The integrated circuit defined in claim 15, wherein the third column sum shift register determines a third column sum based on the vertical gradient.

17. The integrated circuit defined in claim 16, wherein the fourth column sum shift register determines a fourth column sum based on the horizontal gradient and a difference between the current video frame and the previous video frame.

18. The integrated circuit defined in claim 17, wherein the fifth column sum shift register determines a fifth column sum based on the vertical gradient and the difference between the current video frame and the previous video frame.

* * * * *